Dec. 30, 1958     O. NÜBLING     2,866,417
ROTARY PISTON MACHINE
Filed June 11, 1956     3 Sheets-Sheet 1
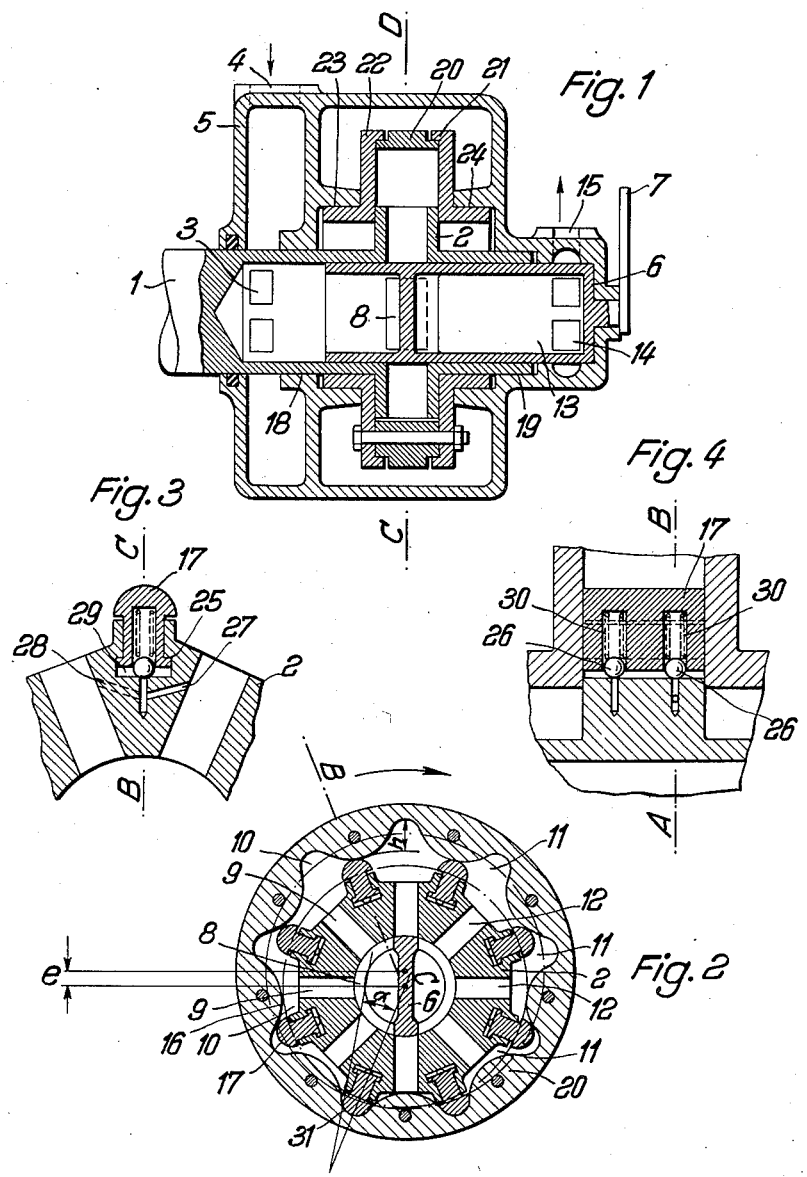

Dec. 30, 1958 O. NÜBLING 2,866,417
ROTARY PISTON MACHINE
Filed June 11, 1956 3 Sheets-Sheet 2

Inventor:
Otto Nübling

Dec. 30, 1958 O. NÜBLING 2,866,417
ROTARY PISTON MACHINE
Filed June 11, 1956 3 Sheets-Sheet 3

Inventor:
Otto Nübling

United States Patent Office 2,866,417
Patented Dec. 30, 1958

2,866,417
ROTARY PISTON MACHINE
Otto Nübling, Berlin-Frohnau, Germany, assignor to Hanomag Aktiengesellschaft, Hannover-Linden, Germany, a corporation of Germany
Application June 11, 1956, Serial No. 590,499
6 Claims. (Cl. 103—126)

The present invention relates to a rotary piston machine, as for instance a rotary piston pump, through means of which fluid or gas is supplied, or a rotary piston motor in which fluid or gas serves as a drive means.

These machines comprise two gears which are arranged one in the other, i. e. an externally toothed inner gear engages an internally toothed outer gear. The number of teeth of both gears differs by one. Furthermore, the gears are journalled eccentrically relative to each other and seal the pressure chambers formed between the teeth. Fluid may be supplied from and passed away from inside or outside, or from the sides. In known machines of this type a more or less effective sealing action between the tooth crests of one gear and the opposite tooth flanks of the other gear is achieved.

Various devices have been developed, intended to improve the sealing effect. However, they do not quite satisfy. One of the improved constructions proposes cutting edges subjected to spring or hydraulic pressure; another one is provided with rubber walls; in a third modified arrangement the cooperating parts of the rotary pistons are movably journalled in the direction of eccentricity.

It is, therefore, one object of the present invention to provide a rotary piston machine wherein present deficiencies are effectively eliminated by providing radially movable tooth crests on at least one of the two gears. They are pressed against the opposite contact surface of the other gear through means of a spring or the pressure of the medium passing through the machine, or through means of both forces combined. Thus, perfect sealing is achieved.

Compared with known rotary piston machines in which two hydraulic members which are eccentrically journalled one in the other and which have prism-shaped slides moving radially in the smaller one of the two cylinder bodies to form the operating chambers together with the wall of the bigger cylindrical body, the present invention does not provide for any such slides. Whilst the slides have to travel a long distance in radial direction during each rotation, the distance to be covered by the slideably arranged tooth crests according to the invention is short and calculated so that it just suffices to render a surface pressure of the tooth crest against the associated tooth flank which is necessary for perfect sealing. This is possible especially in cases where the known tooth system is employed in which the tooth crests of one gear form a circular arc and the tooth crests of the associated gear comprise equidistant hypocycloids or epicycloids.

It is another object of the present invention to provide a rotary piston machine wherein, to prevent possible locking or tilting of the tooth crests, the latter of these are provided with a collar on their inside which limits their radial movement. To allow, in this arrangement, for the tooth crests in the region opposite the point of contact of both pitch circles to render perfect sealing action, the bearing distance of both gears is somewhat smaller than half the tooth depth of the outer gear.

If one of the two gears has an extended cycloid, both gears may be engaged through means of two separate ring gears.

It is yet another object of the present invention to provide a rotary piston machine, wherein the inside of the sliding tooth crests may be provided with two ball retaining valves which are in communication with two adjacent tooth chambers each. Thus, a pressure balance is achieved between the inside of the sliding tooth crest and the tooth chamber in which a higher pressure is effective, without the fluid being able to pass from one tooth chamber to the other. The springs acting on the ball retaining valve at the same time serve to produce the contact pressure for the sliding tooth crest.

With these and other objects in view which will become apparent in the following detailed description, the present invention will be clearly understood in connection with the accompanying drawings, in which Figure 1 is a sectional view through an infinitely variable fluid pump, Fig. 2 is a section along the lines 2—2 of Fig. 1;

Fig. 3 is a cross section through the slideable tooth crest of the inner gear, on an enlarged scale;

Fig. 4 is a longitudinal sectional view through the slideable tooth crest of the inner gear and the two ball retaining valves, on an enlarged scale;

Figure 5:
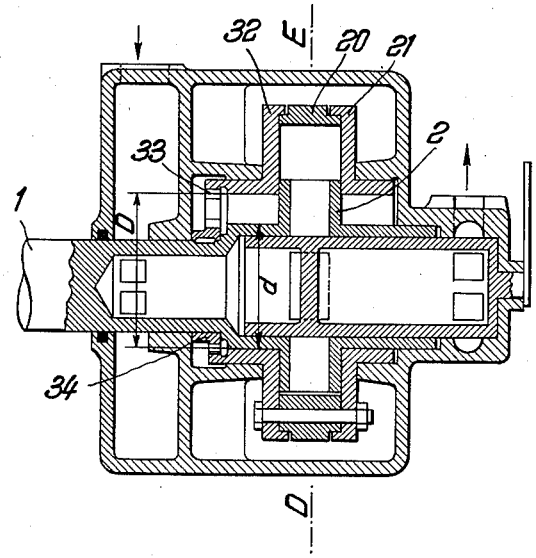
Fig. 5 is a longitudinal sectional view through an infinitely variable pump in which the tooth flanks of the outer gear form extended cycloids.

Referring now to the drawing and in particular to Figs. 1 to 4, a drive shaft 1 is connected with the gear body 2 of the inner gear. The drive shaft 1 is hollow, and the fluid, as for instance, oil which passes through the opening 4 into the housing 5, is supplied through ports 3. The hollow drive shaft 1 accommodates the control valve 6. The volume supplied by the pump can be infinitely varied in known manner by turning the control valve 6 through means of a lever 7. Slots 8 enable the oil to be passed from the hollow control valve 6 through channels 9 into the tooth chambers 10. When the gears rotate in the direction of the arrow indicated in Fig. 2, the size of the tooth chambers 10 increases, whereby the fluid is sucked through the hollow drive shaft 1. The tooth chambers 11 decrease, and the fluid is forced out through the channels 12 into the right hand part 13 of the control valve 6 and through ports 14 to the housing outlet 15. It is known to provide one of both gears, as for instance the outer gear, with cycloid teeth 16. The tooth crests of the associated inner gear 17 in this case conveniently form circular arcs. It is possible, however, to provide the inner gear with cycloid teeth and the outer gear with circular arcs. The drive shaft 1 is journalled in the housing 5 through means of bearings 18 and 19. The associated outer gear 20 is fixedly bolted to cover plates 21 and 22 which are also journalled in the housing 5 through means of bearings 23 and 24. In the housing, the bores for the bearings 23 and 24 for the outer gear 20 and the shaft 1 are eccentric relative to each other for a distance $e$. According to the present invention, the tooth crests 17 of the inner gear 2 are radially movable. A collar 25 limits the radial movement of the slideable tooth crests 17. On the inner side of the tooth crest 17 two ball retaining valves 26 are arranged. Through means of a bore 27 one of the valves 26 is in communication with the right hand tooth chamber 11, the other one through the bore 28 with the tooth chamber 10 on the left side of the tooth crest 17. Thus, always the higher pressure in the left or right hand chamber is effective in the chamber 29. Springs 30 act on the valve balls and press the slideable tooth crest against the opposite tooth flanks chamber to effect sealing even when the pressure in the tooth chambers 10 or 11 and in the chamber 29 is balanced.

According to Fig. 2 the tooth crests 17 on the left side, shown in the embodiment of the invention, are forced against the tooth flanks of the outer gear 20 in tangential direction relative to the pitch circle. In the tooth crest 31 the tooth flank angle $\alpha$ is indicated. Since this is an acute angle, the slideable tooth crest is radially drawn outwardly due to the friction of the tooth crest. To prevent this, the present invention provides a collar 25 at the base of the tooth crest. In the upper part of Fig. 2 and especially in the right half, this danger does not exist because the tooth crests of the inner gear 2, particularly on the right hand side, move away from the tooth flank of the outer gear 20. To ensure perfect sealing of the sliding tooth crests in the upper part of Fig. 2, the distance $e$ for journalling the two gears is somewhat smaller (approx. 0.1 mm.) than the depth $h$ of the tooth of the outer gear.

Figure 6:
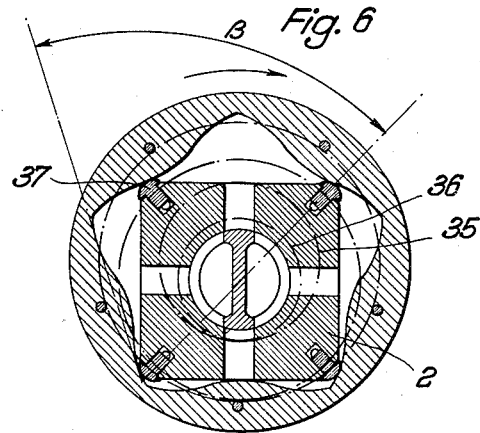
Fig. 6 is a section along the lines 6—6 of Fig. 5.

Referring now to the embodiment disclosed in Figs. 5 and 6, which embodiment prevents the tooth crests from locking, as shown to Fig. 5 the outer gear 20' is bolted on its one side to a cover 32, which at its inner diameter is provided with teeth 33. These teeth 33 are in engagement with a gear 34 keyed on the drive shaft 1. The diameter of the pitch circles 35 and 36 of the two gears correspond to the outer diameter $d$ of the shaft, and, respectively, the inner diameter D of the cover 32. As specified in the German Patent Specification No. K 16323 Ia/59e, the cycloid of the outer gear is extended so that between the body 2' of the inner gear and the covers 21' and 32, respectively, an adequate sealing effect is obtained. Fig. 6 shows that the tooth flank angle $\beta$ is almost 90° so that locking of the tooth crests 37 is no longer possible. The tooth crests 37, as shown in Figs. 3 and 4, are connected with the adjacent tooth chambers 10 and 11 through a check valve 26 and pressed against the tooth flanks of the outer gear 20. As compared to Fig. 3, only the collar 25 on the inner side has been omitted in the structure shown in Fig. 6.

Figure 7:
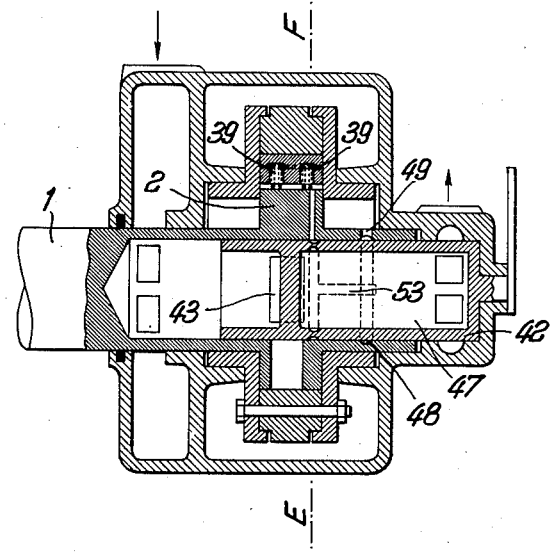
Fig. 7 is a longitudinal sectional view through an infinitely variable pump, in which the slideable tooth crests of the inner gear are oil-pressure controlled on their inside.
Figure 8:
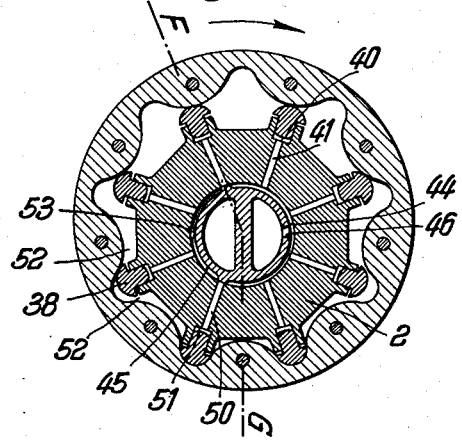
Fig. 8 is a section along the lines 8—8 of Fig. 7.

Referring now to the embodiment disclosed in Figs. 7 and 8, which prevents locking of the tooth crests 38, as shown in Fig. 18 no collars are provided on the sliding tooth crests 38. Furthermore, no check valves are provided, however springs 39 are fitted. The chamber 40 on the inside of the tooth crests 38 is in communication with the inside of the gear through means of a bore 41. Not only is the control valve 42 provided with the usual slots 43 for the oil supply or, respectively, with an opposed port in Fig. 7 (not illustrated), but also with two additional annular channels 44 and 45. The annular channel 44 is in communication with the control valve pressure side 47 through means of a bore 46. Thus, a pressure balance on the pump pressure side is achieved betweeen the inside of the sliding tooth crest 38 and the tooth chambers. It is known to supply the fluid in fluid pumps, as for instance oil pumps, under a certain pre-compression to prevent cavitation. According to the present invention, the annular chamber 45 is in communication with a longitudinal groove 53, an annular chamber 48, and a bore 49, with the inside of the pump housing which through means of a bore (not illustrated) communicates with the atmosphere or with a separate suction pump. When the bore 50 is connected with the annular chamber 45 the pressure in the chamber 51 drops. The pump's pre-compression in the tooth chamber 52 is greater than the pressure in the chamber 51 so that the pump pre-compression forces the sliding tooth crest to the inside and thus prevents locking of the crest.

The invention is applicable also to motors in which fluid is supplied under high pressure, as well as to pumps or oil motors which compress gas instead of a fluid, or which are driven by compressed gas. Internal combustion engines, operating according to the rotary piston principle, may also employ the present invention.

While I have disclosed several embodiments of the present invention, these embodiments are given by example only and not in a limiting sense, the scope of the present invention being determined by the objects and the claims.

I claim:

1. A rotary piston machine comprising an inner gear and an outer gear, said gears meshing with each other and journalled eccentrically relative to each other, said inner gear having a plurality of external teeth and said outer gear having a plurality of internal teeth, the number of said external teeth being equal to the number of said internal teeth plus one more tooth, each of said teeth of one of said gears having a cycloid-shaped engaging face, and each of said teeth of the other of said gears disposed oppositely said cycloid-shaped teeth having a circular arc shaped engaging face of substantially constant radius, said circular arc shaped engaging face constituting the sole contact between said inner and outer gears, the entire crest of said circular arc shaped teeth being mounted for radial reciprocating movement and engaging said oppositely disposed cycloid-shaped teeth, whereby cocking of said crests is prevented and pressure means forcing said crests against the oppositely disposed contact surfaces of said other gear in such a manner that said crest engages continuously the tooth flank of the opposite gear during rotation of said machine.

2. The rotary piston machine, as set forth in claim 1, wherein said movable tooth crests are forced against the opposite contact surface on said other gear by the pressure of the medium circulating in said machine.

3. The rotary piston machine, as set forth in claim 1, wherein said gear having said circular arc shaped teeth defines a plurality of peripherally disposed chambers equal in number with that of said crests, and slidably receiving the latter, said crests having a collar formation at their inner end and the outer wall of said chambers forming abutment faces for said collar formation of said crests and limiting the outward radial movement of said crests.

4. The rotary piston machine, as set forth in claim 3, which includes a check-valve disposed at the inner end of each of said chambers, and said gear having said circular arc shaped teeth having bores connecting each of said chambers with the pressure and the suction side of said machine, respectively, said check-valves closing and opening the respective bores depending upon the pressure in said chambers.

5. The rotary piston machine, as set forth in claim 1, which includes stop means abutting a corresponding outer face of said inner gear and disposed on the side of said tooth crests opposite the contact surface of said inner gear, for limiting the inward movement of said tooth crests.

6. The rotary piston machine, as set forth in claim 1, which includes a second pair of gears driving both of said first mentioned gears, and the tooth flanks of one of said second pair of gears forming an extended cycloid.

References Cited in the file of this patent

UNITED STATES PATENTS

| 724,994 | Cooley | Apr. 7, 1903 |
| 2,694,288 | Nübling | Nov. 16, 1954 |

FOREIGN PATENTS

| 14,889 | Netherlands | July 15, 1926 |
| 394,985 | Great Britain | July 5, 1933 |
| 404,424 | Great Britain | Jan. 18, 1934 |
| 836,441 | France | Oct. 17, 1938 |
| 853,807 | France | Dec. 16, 1939 |